I. N. & C. F. LATCHAW.
DISINFECTING DEVICE.
APPLICATION FILED NOV. 1, 1918.
1,298,972.
Patented Apr. 1, 1919.
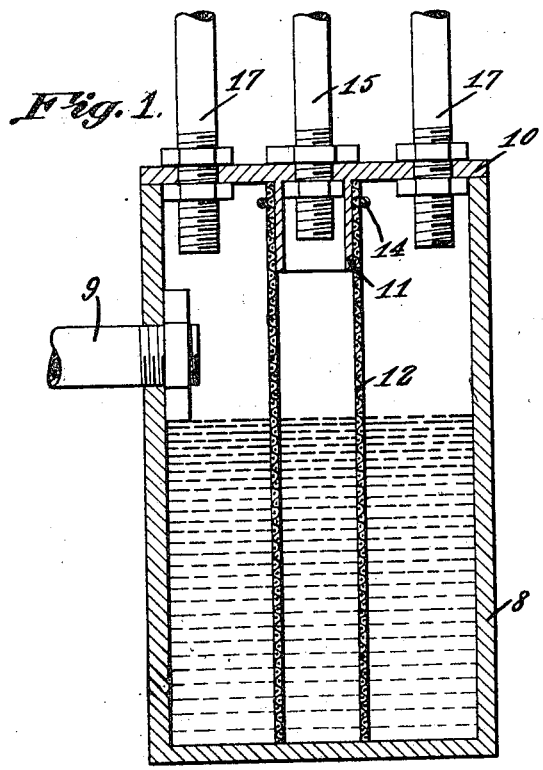
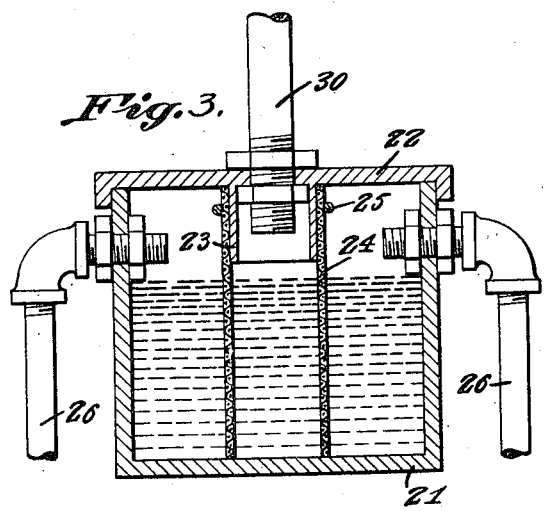
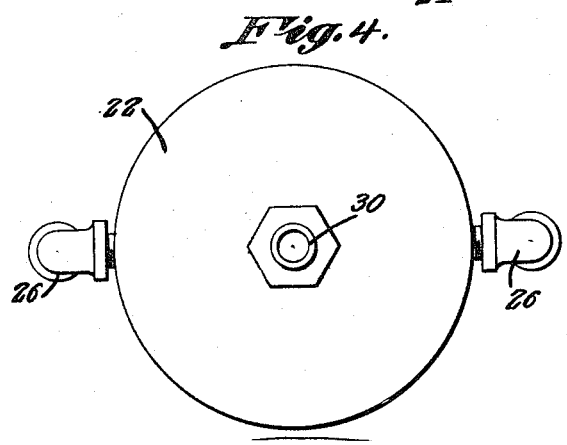
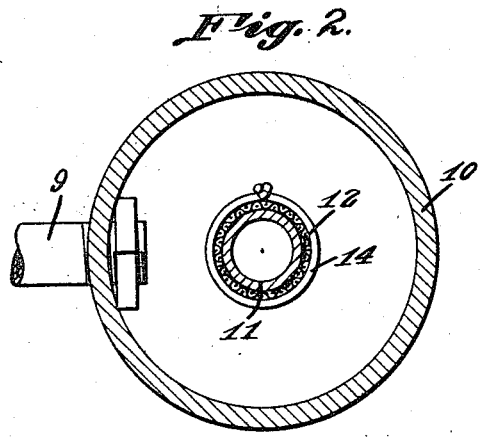
I. N. Latchaw and C. F. Latchaw, Inventors
Witness
By C. A. Snow & Co.
Attorneys

UNITED STATES PATENT OFFICE.

ISAAC N. LATCHAW AND CHARLES F. LATCHAW, OF FINDLAY, OHIO.

DISINFECTING DEVICE.

1,298,972.  Specification of Letters Patent.  Patented Apr. 1, 1919.

Application filed November 1, 1918. Serial No. 260,669.

*To all whom it may concern:*

Be it known that we, ISAAC N. LATCHAW and CHARLES F. LATCHAW, citizens of the United States, residing at Findlay, in the county of Hancock, State of Ohio, have invented a new and useful Disinfecting Device, of which the following is a specification.

It is the object of this application to provide a novel disinfecting device for mausoleums.

In the accompanying drawings:—

Figure 1 is a section showing the lower tank; Fig. 2 is a cross section of the tank shown in Fig. 1; Fig. 3 is a section of the upper tank; Fig. 4 is a top plan of the upper tank.

The structure forming the subject matter of this application may be used in connection with mausoleums and beneath the floor of the mausoleum is placed a first tank 8 having an air inlet 9. The tank 8 is provided with a top 10 from which depends a sleeve 11 surrounded by a tubular wick 12, preferably made of mineralized material, the wick being held on the sleeve 11 by any suitable means 14. A pipe filling 15 is assembled with the top 10 and opens at its lower end, within the sleeve 11 and within the tubular wick 12. Outlet pipes 17 are assembled at their lower ends with the top 10 of the tank 8 and are adapted to communicate with the crypts of a mausoleum.

On the top of a mausoleum a second tank 21 is adapted to be placed. The tank 21 is supplied with a top 22, carrying a depending sleeve 23, around which extends a tubular wick 24 held in place by a retaining means 25. The second tank 21 has lateral air inlets 26 extended from the crypts of a mausoleum. The top 22 of the second tank 21 carries a combined outlet and filling member 30 preferably in the form of a pipe, opening at its lower end within the sleeve 23 and within the tubular wick 24.

In practical operation, a quantity of formaldehyde or other substance may be introduced into the tank 8 by way of the pipe 15. In a similar way formaldehyde may be introduced into the tank 21 through the pipe 30. Air enters the first tank 8 through the inlet 9. The tubular wick 12 is at all times saturated with formaldehyde, since the wick dips into the formaldehyde solution in the tank. The air, having been delivered into the tank 8 through the inlet 9, is impregnated with formaldehyde gas and traverses the outlet pipes 17. The air within the crypts may flow upwardly through the inlets 26 into the tank 21. The air is here mixed again with formaldehyde gas derived from the saturated wick 24, the air passing through the wick to the interior thereof, and leaving by way of the pipe 30.

Having thus described the invention, what is claimed is:—

A disinfecting device comprising a tank including a top provided with a depending tubular sleeve; a depending tubular wick surrounding the sleeve and extended downwardly into the tank; a pipe assembled with the top portion of the tank and communicating with the interior of the sleeve and with the interior of the wick; and an air inlet for the tank external to the wick and the sleeve.

In testimony that we claim the foregoing as our own, we have hereto affixed our signatures in the presence of two witnesses.

ISAAC N. LATCHAW.
CHAS. F. LATCHAW.

Witnesses:
LEWIS D. FIRMISS,
ROSS J. WETHERALD.